United States Patent
Strangman et al.

(10) Patent No.: US 7,282,271 B2
(45) Date of Patent: Oct. 16, 2007

(54) DURABLE THERMAL BARRIER COATINGS

(75) Inventors: Thomas E. Strangman, Prescott, AZ (US); Derek Raybould, Denville, NJ (US)

(73) Assignee: Honeywell International, Inc., Morristown, NJ (US)

(*) Notice: Subject to any disclaimer, the term of this patent is extended or adjusted under 35 U.S.C. 154(b) by 0 days.

(21) Appl. No.: 11/000,743

(22) Filed: Dec. 1, 2004

(65) Prior Publication Data
US 2006/0115660 A1    Jun. 1, 2006

(51) Int. Cl.
B32B 9/00    (2006.01)
B05D 3/02    (2006.01)

(52) U.S. Cl. ............ 428/469; 428/472; 428/701; 428/702; 204/192.1; 427/248.1; 427/376.2

(58) Field of Classification Search ............ None
See application file for complete search history.

(56) References Cited

U.S. PATENT DOCUMENTS

| | | |
|---|---|---|
| 4,880,614 A | 11/1989 | Strangman et al. |
| 5,015,502 A | 5/1991 | Strangman et al. |
| 5,137,774 A * | 8/1992 | Ruppi ............ 428/216 |
| 5,624,721 A | 4/1997 | Strangman et al. |
| 5,716,720 A * | 2/1998 | Murphy ............ 428/623 |
| 5,843,585 A | 12/1998 | Alperine et al. |
| 5,856,027 A | 1/1999 | Murphy |
| 6,096,381 A | 8/2000 | Zheng |
| 6,123,997 A * | 9/2000 | Schaeffer et al. ...... 427/383.7 |
| 6,153,313 A | 11/2000 | Rigney et al. |
| 6,190,124 B1 * | 2/2001 | Freling et al. ........... 415/173.4 |
| 6,482,537 B1 | 11/2002 | Strangman et al. |
| 6,485,845 B1 | 11/2002 | Wustman et al. |
| 6,495,271 B1 | 12/2002 | Vakil |
| 6,764,779 B1 | 7/2004 | Liu et al. |
| 2003/0022012 A1 | 1/2003 | Warnes et al. |
| 2003/0041928 A1 | 3/2003 | Spitsberg et al. |
| 2003/0180571 A1 | 9/2003 | Singh |
| 2003/0203221 A1 | 10/2003 | Spitsberg |
| 2004/0018303 A1 | 1/2004 | Bruce et al. |
| 2004/0131865 A1 | 7/2004 | Kim et al. |
| 2005/0025898 A1 * | 2/2005 | Bengtsson et al. .......... 427/446 |

FOREIGN PATENT DOCUMENTS

| | | |
|---|---|---|
| EP | 0 366 924 A | 5/1990 |
| EP | 0 733 723 A | 9/1996 |
| EP | 1 215 301 | 12/2000 |
| EP | 1 127 959 A | 8/2001 |
| WO | PCT/US2005/042280 | 7/2006 |

* cited by examiner

*Primary Examiner*—Jennifer McNeil
*Assistant Examiner*—Timothy M. Speer
(74) *Attorney, Agent, or Firm*—Ingrassia Fisher & Lorenz

(57) ABSTRACT

A durable protective coating may be formed by applying a thin layer of metastable alumina to a bond coating on a substrate. A thermal barrier coating may then be applied to the metastable alumina and the resulting part may be heat treated to transform the metastable alumina to a mixed alpha alumina having particles of the thermal barrier coating, such as zirconia in the case of an yttria stabilized zirconia thermal barrier coating, dispersed therein. The resulting thermal barrier coating may inhibit microbuckling of the thermally grown oxide scale that grows over time at the thermal barrier coating-bond coating interface.

27 Claims, 1 Drawing Sheet

DURABLE THERMAL BARRIER COATINGS

BACKGROUND OF THE INVENTION

The present invention generally relates to durable thermal barrier coatings and methods for making the same. More particularly, the present invention relates to a durable thermal barrier coating having improved bonding to a bond coating on a substrate.

Ceramic thermal barrier coatings (TBCs) have received increased attention for advanced gas turbine engine applications. The advantages of using TBCs include increased engine efficiency by allowing higher gas temperatures and improved reliability from lower component temperatures. TBC systems have been more aggressively designed for the thermal protection of engine hot section components, thus allowing significant increases in engine operating temperatures, fuel efficiency and reliability. However, the increases in engine temperature can raise considerable coating durability issues. The development of next generation lower thermal conductivity and improved thermal stability TBCs thus becomes a necessity for advancing the ultra-efficient and low emission gas turbine engine technology.

Partial loss of cohesion between an yttria stabilized zirconia (YSZ) TBC deposited by, for example, electron beam physical vapor deposition (EB-PVD), and an underlying bond coating may contribute to TBC spalling. When this partial loss of cohesion occurs, alumina growth stresses and alumina-superalloy thermal expansion mismatch stresses within the thermally grown oxide, which occur during thermal transients, may form microbuckles in the thermally grown oxide at the TBC-bond coating interface. Once initiated, interfacial microbuckles continue to grow at operational temperatures in the range of 900 to 1150° C. because bond coatings, such as Pt-aluminide or NiCoCrAlY, have insufficient creep-strength to constrain the area-growth of the thermally grown oxide scale.

U.S. Patent Publication Number 2003/0203221, by Spitsberg, discloses a thermal barrier coating that may be improved by thermally preoxidizing the grit blasted single-phase Pt-aluminide bond coating in a low pressure vacuum prior to deposition of the thermal barrier coating. Preoxidation in vacuum forms a thin layer of pure alumina on the Pt-aluminide bond coating. Spitsberg has the disadvantage that the preoxidation parameters are specific to a particular substrate and bond coating. Furthermore, Spitsberg states (at paragraph [0025]) that the preferred heat treatments produce a crystallographically stable alpha-alumina, which maximized the TBC life in furnace cycle tests.

U.S. Pat. No. 6,482,537, to Strangman et al., discloses the reduction of the thermal conductivity of a TBC by decorating deposition interfaces within the columnar grains of an EB-PVD thermal barrier coating with nano-scale particles of alumina or tantala. The Strangman patent discloses that the bond coating may have a thermally grown alumina scale and that thermal growth of the alumina scale may be performed prior to or during EB-PVD deposition of the TBC.

U.S. Pat. No. 6,485,844, to Strangman et al., discloses a fully metastable high purity alumina scale that may be thermally grown at low temperatures on an undiffused bond coating comprising a high purity layer of platinum and a CVD deposited layer of high purity alumina. The Strangman patent discloses that, under controlled conditions, a metastable alumina scale is grown at low temperature and may be subsequently converted to the stable alpha phase during a high-temperature heat treatment prior to the deposition of the TBC.

As can be seen, there is a need for improved thermal barrier coatings having long life and high reliability, whereby TBC spalling is minimized or eliminated. There is also a need for an improved method for making such a thermal barrier coating that would resist spalling over repeated temperature cycles.

SUMMARY OF THE INVENTION

In one aspect of the present invention, a protective coating for a substrate comprises a thermal barrier coating; and an interfacial layer between the substrate and the thermal barrier coating, the interfacial layer comprising a mixture of alpha alumina and thermal barrier coating, the alpha alumina being formed from the heat treatment of metastable alumina.

In another aspect of the present invention, a protective coating for a substrate comprises a bond coating on the substrate; a metastable alumina layer on the bond coating; and a thermal barrier coating on the metastable alumina layer.

In yet another aspect of the present invention, a protective coating for a substrate comprises a bond coating on the substrate; an interfacial layer on the bond coat; and a thermal barrier coating on the interfacial layer; wherein: the interfacial layer comprises alpha alumina dispersed with particles of the thermal barrier coating; and the interfacial layer is formed from the heat treatment of metastable alumina applied to the bond coat.

In a further aspect of the present invention, a protective coating for a substrate comprises a bond coating on the substrate; a metastable alumina layer on the bond coating, the metastable alumina layer having a uniform thickness of about 1 micron; and a yttria stabilized zirconia thermal barrier coating applied by an electron beam evaporation physical vapor deposition method; wherein heat treatment of the thermal barrier transforms the metastable alumina to an interfacial layer comprising alpha alumina and zirconia.

In yet a further aspect of the present invention a coated component, comprises a substrate; and a protective coating disposed on the substrate, wherein the protective coating comprises a bond coating on the substrate; a metastable alumina layer on the bond coating, the metastable alumina layer having a uniform thickness of about 1 micron; and an yttria stabilized zirconia thermal barrier coating applied to the metastable alumina layer by an electron beam evaporation physical vapor deposition method; wherein heat treatment of the coated component transforms the metastable alumina to an interfacial layer comprising alpha alumina and zirconia.

In yet a further aspect of the present invention a coated component, comprises a substrate; and a protective coating disposed on the substrate, wherein the protective coating comprises a bond coating on the substrate, which may have a thermally grown or deposited layer of crystallographically stable alpha alumina; a metastable alumina layer on the bond coating, the metastable alumina layer having a uniform thickness of about 1 micron; and a yttria stabilized zirconia thermal barrier coating applied to the metastable alumina layer by an electron beam evaporation physical vapor deposition method; wherein heat treatment of the coated component transforms the metastable alumina to an interfacial layer comprising alpha alumina and zirconia.

In still a further aspect of the present invention, a method for providing a protective coating to a substrate, the method comprises applying a bond coating on the substrate; depositing a metastable alumina layer on the bond coating; depositing a thermal barrier coating on the metastable alumina layer; heat treating the metastable alumina layer to form a stable alpha alumina layer having particles of the thermal barrier coating dispersed therein.

In yet a further aspect of the present invention, a method for inhibiting spalling of a thermal barrier coating from a substrate comprises providing an interfacial layer between the thermal barrier coating and the substrate, the interfacial layer comprising stable alpha alumina having particles of the thermal barrier coating dispersed therein, the stable alpha alumina being formed from the heat treatment of metastable alumina.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides an improved thermal barrier coating and methods for improving the durability of a thermal barrier coating by the application of a thin layer of metastable alumina to the surface of the bond coating prior to deposition of a thermal barrier coating (TBC) comprising, for example, yttria stabilized zirconia (YSZ). During thermal barrier coating deposition and the initial portion of the post-coating heat treatment, the metastable alumina layer has solubility for constituents of the thermal barrier coating. Subsequent transformation of the metastable alumina to crystallographically stable alpha alumina during coating deposition and the post-coating heat treatment results in precipitation of a fine dispersion of thermal barrier constituents within the alpha alumina. The durable thermal barrier coatings of the present invention may be useful in any environment where thermal barrier coatings may be utilized. For example, TBCs of the present invention may be useful on components, such as airfoils, turbine shrouds and combustor heat shields, of engines for aircraft, industrial applications, ground vehicles (e.g., tanks), and the like.

Unlike some conventional thermal barrier coatings that work only for specific bond coats and substrates, the TBC and methods of the present invention may be used on a variety of bond coatings and substrates. Further, unlike conventional thermal barrier coatings, the TBC and methods of the present invention do not require a pre-formation of the alumina layer, but instead, the present invention assures the presence of a layer of metastable high-purity alumina on the surface of the bond coating prior to initiation of the deposition of an EB-PVD zirconia thermal barrier coating.

Figure 1:
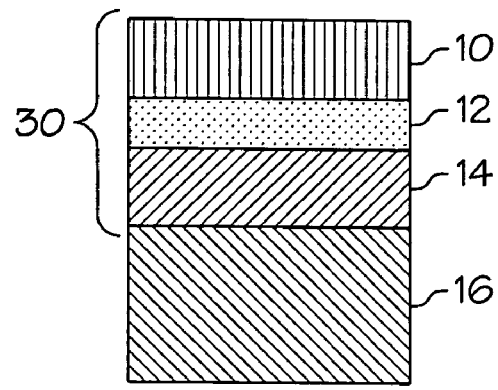
FIG. 1 is a schematic cross-sectional representation of a thermal barrier coating applied to a substrate prior to heat treatment, according to an embodiment of the present invention.

Referring to FIG. 1, there is shown a schematic (not to scale) cross-sectional view of a thermal barrier coating 10 applied to a substrate 16 having a bond coating 14 and a metastable alumina layer 12 therebetween. Thermal barrier coating 10 may comprise, as non-limiting examples, a stabilized zirconia-based thermal barrier coating, such as yttria stabilized zirconia (YSZ), or a stabilized hafnia-based thermal barrier coating, such as yttria stabilized hafnia (YSH). The thickness of thermal barrier coating 10 may vary according to design parameters and may be, for example, between about 50 and about 1000 µm, and typically between about 100 and 250 µm. Substrate 16 may be any base material onto which deposition of a thermal barrier coating 10 may be desirable. For example, substrate 16 may be composed of a Nickel-based or a Cobalt-based superalloy.

Bond coating 14 may comprise a material for bonding thermal barrier coating 10 to substrate 16. For example, bond coating 14 may comprise a Pt-aluminide bond coating or a NiCoCrAl"X" bond coating, where "X" is typically Y, but may also comprise Sc, La, Hf, Si, Ta, Re, and Pt. Pt-aluminide and NiCoCrAlY bond coatings are known in the art as bond coating materials. In some embodiments of the present invention, bond coating 14 may be applied to a thickness from about 10 to about 150 µm, and typically from about 25 to about 125 µm.

Metastable alumina layer 12 may be applied to the surface of bond coating 14 prior to deposition of the thermal barrier coating 10. A thin layer (for example, having a thickness in the range of from about 0.1 to about 5 µm, and typically of less than 1 µm) of metastable alumina 12 may be applied by various deposition processes known in the art. As non-limiting examples, metastable alumina layer 12 may be applied by a solvent based process, by a sol gel process, or by a chemical vapor deposition (CVD) process, such as atomic layer deposition.

Following application of metastable alumina layer 12, thermal barrier coating 10 may be applied by a conventional technique known in the art, such as electron beam evaporation physical vapor deposition (EB-PVD). Thermal barrier coating 10 may also be applied by plasma spraying. Metastable alumina layer 12 has a high solubility for metal oxides, such as $ZrO_2$ in YSZ, in thermal barrier coating 10.

Figure 2:
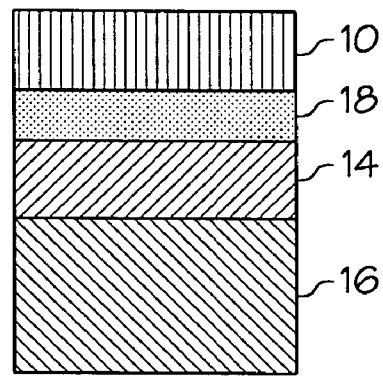
FIG. 2 is a schematic cross-sectional representation of a thermal barrier coating applied to a substrate after heat treatment, according to an embodiment of the present invention.

Following application of the thermal barrier coating 10, the resulting coated component 30 (as shown in FIG. 1) may be heated at a temperature from about 1000° C. to about 1150° C. Typically, this heat treatment may be carried out in an inert atmosphere, such as argon, or in a vacuum. This heat treatment process may be continued until metastable alumina layer 12 is fully transformed to an interfacial layer 18 comprising crystallographically stable alpha alumina that contains a dispersion of particles solubilized from thermal barrier coating 10 as shown in FIG. 2. For example, in a case where a YSZ thermal barrier coating 10 is used, the transformation of metastable alumina layer 12 to stable phases of interfacial layer 18 may result in interfacial layer 18 comprising a mixture of alpha alumina and zirconia. The presence of the mixed alpha alumina and zirconia interfacial layer 18 may reduce the thermal expansion mismatch between substrate 16 and interfacial oxide layer 18, and may improve cohesion between interfacial oxide layer 18 and the columnar grained YSZ thermal barrier coating 10. The presence of the mixed alpha alumina and zirconia interfacial layer 18 may also reduce the thermal expansion mismatch between bond coating 14 and interfacial oxide layer 18, and may improve cohesion between interfacial oxide layer 18 and the bond coating 14.

It is preferred that the metastable alumina layer 12 be fully transformed in a controlled post-coating heat-treatment environment to an interfacial layer 18 comprising a mixture of stable alpha alumina and constituents of the thermal barrier coating. However, heat-treatment transformation of the metastable alumina layer to the crystallographically stable alpha phase may also be accomplished by thermal exposure of the coated component to substrate temperatures in the range of 1000 to 1150° C. service environment, such as exists in a gas turbine engine.

Figure 3:
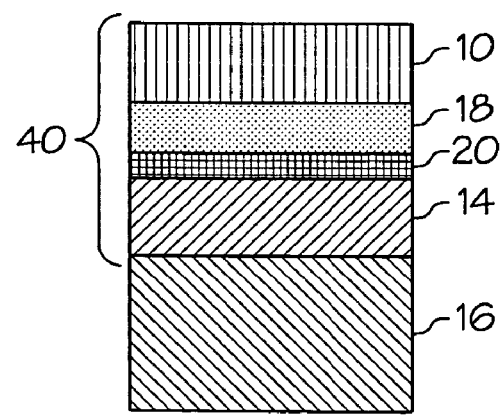
FIG. 3 is a schematic cross-sectional representation of a thermal barrier coating on a substrate after exposure to high temperature oxidation.

Referring now to FIG. 3, there is shown a schematic (not to scale) cross-sectional representation of a protective coating 40 on substrate 16 after exposure to a high temperature oxidizing environment. A thermally grown alpha alumina layer 20 may grow between interfacial layer 18 and bond coating 14 due to subsequent thermal oxidation of bond coating 14 during a post-coating heat treatment or service exposure to a high temperature oxidizing environment. The improved bonding of thermal barrier layer 10 to substrate 16, according to one aspect of the present invention, may enable thermal barrier layer 10 and interfacial oxide layer 18 to effectively constrain the area growth of thermally grown alpha alumina layer 20. This constraint of the area growth of thermally grown alpha alumina layer 20 results in relaxation of in-plane growth stresses that occur within the thermally grown alpha alumina layer 20 and therefore may reduce the driving force for micro- and macro-buckling at the thermal barrier coating 10—bond coating 14 interface.

In another embodiment, alpha alumina layer 20 may be formed on bond coating 14 prior to the deposition of the metastable alumina layer 18. Formation of alpha alumina layer 20 may comprise thermal oxidation of the bond coating during a heat treatment or deposition of alpha alumina by a high temperature chemical vapor deposition or physical vapor deposition process.

EXAMPLE

The following example describes a method for making the durable thermal barrier coating according to the present invention.

An alumina sol gel solution is prepared in a 1000 ml container by first pouring 700 ml xylene into the container and then mixing 140 g of aluminum isoproxide with the xylene. The solution is mixed using a magnetic stirrer until all the aluminum isoproxide is dissolved in the solution. 140 ml of methanol is then added to the solution and mixed.

A turbine blade with a Pt-aluminide bond coating is placed in the vessel and entirely submerged in the sol gel solution. The turbine blade is slowly removed from the vessel at a constant speed, and then fully air "dried." Next, the blade is placed in an air furnace at about 300° C. for about one hour. Finally, the blade is placed in a vacuum furnace and heated for one hour at about 550° C. and then cooled to ambient temperature. This heat treatment in vacuum may be carried out in the initial part of the EB-PVD coating of 7 weight % yttria stabilized zirconia, YSZ, described below.

The blade with essentially an amorphous alumina coating over the Pt-aluminide bond coating is then coated with 7% YSZ using EB-PVD. A 7% YSZ ingot is heated by the electron beam so that vapor from the ingot coats the turbine blade, which is preheated to a temperature of around 900° C. The blade is slowly cooled to ambient before being removed from the EB-PVD coater.

The blade is then heat-treated for 8 hours at 1100° C. to transform the metastable alumina to crystallographically stable alpha alumina. The use of higher temperatures up to ~1200° C., may shorten this time. It is known that changing variables, such as, the acid in an acid catalyzed sol-gel or the drying temperature can affect the type of alumina phase that is formed, but these phases are still metastable and transform to stable alpha alumina when heated to high temperatures.

It should be understood, of course, that the foregoing relates to exemplary embodiments of the invention and that modifications may be made without departing from the spirit and scope of the invention as set forth in the following claims.

We claim:

1. A protective coating for a substrate comprising:
   a thermal barrier coating comprising a ceramic material; and
   an interfacial layer between the substrate and the thermal barrier coating, the interfacial layer comprising a layer of alpha alumina having particulates of the ceramic material from the thermal barrier coating dispersed in the otherwise crystallographically stable alpha alumina layer, the alpha alumina being formed from the heat treatment of metastable alumina.

2. The protective coating according to claim 1, wherein the alpha alumina is formed from metastable alumina by heat treatment of the protective coating after deposition of the thermal barrier coating.

3. The protective coating according to claim 1, further comprising a bond coating between the substrate and the interfacial layer.

4. The protective coating according to claim 3, wherein the bond coating is Pt-aluminide or NiCoCrAlY.

5. The protective coating according to claim 1, wherein the thermal barrier coating comprises yttria stabilized zirconia.

6. The protective coating according to claim 5, wherein the interfacial layer comprises alpha alumina and zirconia.

7. The protective coating according to claim 1, wherein the thermal barrier coating is deposited by electron beam vaporization physical vapor deposition (EB-PVD).

8. The protective coating according to claim 1, wherein the metastable alumina is deposited by a sol gel method.

9. The protective coating according to claim 1, wherein the metastable alumina is deposited by a CVD method.

10. The protective coating according to claim 1, wherein the heat treatment occurs from about 1000° C. to about 1150° C.

11. The protective coating according to claim 1, wherein the metastable alumina is applied as a layer having a thickness of about 0.1 to 5 micron.

12. The protective coating according to claim 1, wherein the metastable alumina is applied as a layer having a thickness of about 1 micron.

13. The protective coating according to claim 1, further comprising a thermally grown or deposited layer of alpha alumina between the substrate and the interfacial layer.

14. A protective coating for a substrate comprising:
    a bond coating on the substrate;
    an interfacial layer on the bond coating; and
    a thermal barrier coating on the interfacial layer, wherein:
    the interfacial layer comprises a layer of alpha alumina having particles dispersed therein, the particles solubilized from the thermal barrier coating, and the interfacial layer is formed from the heat treatment of metastable alumina applied to the bond coat.

15. The protective coating according to claim 14, wherein the metastable alumina is applied in a layer having a thickness of about 1 micron.

16. The protective coating according to claim 14, wherein the thermal barrier coating comprises yttria stabilized zirconia deposited by electron beam physical vapor deposition.

17. The protective coating according to claim 14, wherein the thermal barrier coating is yttria stabilized zirconia and the interfacial layer is a mixed alpha alumina and zirconia layer.

18. A method for providing a protective coating to a substrate, the method comprising:
   applying a bond coating on the substrate;
   depositing a metastable alumina layer on the bond coating;
   depositing a thermal barrier coating on the metastable alumina layer;
   heat treatment transformation of the metastable alumina layer to form a stable alpha alumina layer having particles of the thermal barrier coating dispersed therein.

19. The method according to claim 18, wherein the metastable alumina layer is applied by a liquid based deposition method or a chemical vapor based deposition method.

20. The method according to claim 18, wherein the thermal barrier coating is applied by an electron beam physical vapor deposition method.

21. The method according to claim 18, wherein the thermal barrier coating is applied by the plasma spray deposition method.

22. The method according to claim 18, wherein the heat treating step is carried out at a temperature between about 1000° C. and about 1150° C.

23. The method according to claim 18, wherein:
   the thermal barrier coating comprises yttria stabilized zirconia, and
   the particles dispersed in the stable alpha alumina comprise zirconia.

24. A method for inhibiting spalling of a thermal barrier coating from a substrate comprising:
   providing an interfacial layer between the thermal barrier coating and the substrate, the interfacial layer comprising stable alpha alumina having particles of the thermal barrier coating dispersed therein, the stable alpha alumina being formed from the heat treatment of metastable alumina.

25. The method according to claim 24, wherein the thermal barrier coating is deposited prior to the heat treatment of the metastable alumina.

26. The method according to claim 25, wherein the thermal barrier coating is yttria stabilized zirconia.

27. The method according to claim 26, wherein the interfacial layer comprises stable alpha alumina and zirconia.

* * * * *